United States Patent
Ommundsen et al.

(10) Patent No.: US 6,770,714 B2
(45) Date of Patent: Aug. 3, 2004

(54) PROCESS FOR PRODUCING PROPYLENE BASED POLYMER COMPOSITIONS

(75) Inventors: Espen Ommundsen, Langesund (NO); Arild Follestad, Stathelle (NO); Mika Harkonen, Porsgrunn (NO); Merja Poikela, Espoo (FI); Pirjo Jaaskelainen, Porvoo (FI); Kauno Alastalo, Vienna (AT)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/240,997
(22) PCT Filed: Apr. 9, 2001
(86) PCT No.: PCT/GB01/01604
§ 371 (c)(1), (2), (4) Date: Mar. 6, 2003
(87) PCT Pub. No.: WO01/77224
PCT Pub. Date: Oct. 18, 2001

(65) Prior Publication Data
US 2003/0176603 A1 Sep. 18, 2003

(30) Foreign Application Priority Data
Apr. 7, 2000 (GB) .............................. 0008690

(51) Int. Cl.$^7$ .............................. C08F 8/00; C08L 23/04
(52) U.S. Cl. ....................... 525/191; 525/240
(58) Field of Search ................ 525/191, 240

(56) References Cited
U.S. PATENT DOCUMENTS
6,180,721 B1 * 1/2001 Rogestedt et al. .......... 525/191
6,319,998 B1 * 11/2001 Cozewith et al. ............. 526/65
6,342,566 B2 * 1/2002 Burkhardt et al. .......... 525/191

FOREIGN PATENT DOCUMENTS
| | | |
|---|---|---|
| EP | 0 373 660 | 6/1990 |
| EP | 0 763 553 | 3/1997 |
| EP | 0 826 728 | 3/1998 |
| EP | 0 841 372 | 5/1998 |
| EP | 0 887 380 | 12/1998 |
| WO | WO 94/06859 | 3/1994 |
| WO | WO 96/02583 | 2/1996 |
| WO | WO 96/06132 | 2/1996 |
| WO | WO 96/11218 | 4/1996 |
| WO | WO 98/21275 | 5/1998 |
| WO | WO 98/59002 | 12/1998 |

* cited by examiner

*Primary Examiner*—Nathan M. Nutter
(74) *Attorney, Agent, or Firm*—Ohlandt, Greeley, Ruggiero & Perle (57) ABSTRACT

A process for the production of a propylene based polymer, the process comprising the following steps: (a) a first polymerization stage comprising homopolymerizing propylene or copolymerizing propylene and at least one alpha-olefin in the presence of an alpha-olefin polymerization catalyst whereby to produce a polypropylene component; (b) a second polymerization stage comprising copolymerizing ethylene and at least one alpha-olefin in the presence of an alpha-olefin polymerization catalyst whereby to produce an ethylene/alpha-olefin copolymer component; and (c) blending the polymer components produced in steps (a) and (b) whereby to produce a polymer blend, wherein the first and second polymerization stages are effected in separate polymerization reactors connected in parallel. Also provided are polymer compositions comprising: (i) 30 to 97% by weight, based on the total weight of the polymer composition, of a propylene based polymer; and (ii) 3 to 70% by weight, preferably 5 to 20% by weight, based on the total weight of the polymer composition, of an ethylene copolymer plastomer (e.g., an ethylene-propylene plastomer) containing at least 60% by weight ethylene.

9 Claims, 5 Drawing Sheets

PROCESS FOR PRODUCING PROPYLENE BASED POLYMER COMPOSITIONS

FIELD OF THE INVENTION

The present invention relates to improvements in and relating to the preparation of polypropylene based polymers, in particular to the preparation of polypropylene polymers having excellent impact strength as well as high resistance to stress whitening.

DISCUSSION OF THE BACKGROUND ART

Polypropylene has unique properties such as low density, excellent chemical resistance and rigidity. However, certain polypropylene polymers, e.g. homopolypropylene and polypropylene random copolymers (RACOs), have poor impact resistance especially at low temperatures. This has led to the development of a large number of propylene based polymers in which polypropylene polymers are modified by blending with elastomers, e.g. ethylene-propylene rubbers, in which the elastomer forms a dispersed phase in a polypropylene matrix thereby improving impact strength. Heterophasic polypropylene copolymers (HECOs), i.e. polymers containing a propylene polymer matrix and an elastomer, are one example of such materials.

Although having good impact resistance, heterophasic polypropylene copolymers are susceptible to stress whitening when exposed to mechanical stresses. When damaged (e.g. when bent or subjected to impact) the optical appearance of the polymer alters, i.e. this becomes opaque. Although stress whitening may have no effect on the geometrical and/or mechanical properties of the polymer, this nevertheless limits the use of such materials in cases where the appearance of the polymer product is important, e.g. in the production of toys, household and technical appliances, transport and storage boxes, etc. Since stress whitening can also lead to surface damage, it is also generally undesirable to use such polymer products for packaging of food or medical products where it is important that packaging should be kept sterile.

Stress whitening associated with heterophasic polypropylene copolymers can be reduced by further inclusion within the polypropylene material of a plastomer. Typically, a plastomer may be dispersed in the polypropylene material as the result of a blending process.

When blending any polypropylene based polymer (e.g. a polypropylene homo- or copolymer, or a heterophasic polypropylene copolymer) with an elastomeric polymer (e.g. a plastomer), it is generally considered necessary to ensure that the density, weight average molecular weight (Mw) and/or MFR of the elastomeric component (e.g the plastomer) is matched to that of the polypropylene component to ensure adequate homogenization of the resulting blend. This may, for example, be achieved by prior blending of the polypropylene component with a suitable plastomer.

Typically, polypropylene blends are prepared by blending or compounding of separate polymer components, e.g. a propylene polymer material and a plastomer, produced in different polymer plants. As a result, transport and handling costs are high. An additional compounding or extrusion step is also necessary to produce the final polymer blend.

In most polymer plants (e.g. those producing polypropylene), polymerization reactors, supporting systems and extruders are designed to have identical production capacities. This may present problems when an attempt is made to add a second polymer component (e.g. a plastomer) immediately prior to extrusion—due to the limited capacity of the extruder it is generally necessary to reduce the rate of polymer production within the plant. Clearly, this is undesirable.

Alternatively, so-called "reactor blends" can be produced by means of a cascade polymerization process in which the same or different catalyst systems are employed to produce different polymers, typically in two or more separate reactors connected in series. Multi-stage processes in which different catalyst systems are employed in sequential polymerization stages are described, for example, in EP-A-763553 (Mitsui) and WO 96/02583 (Montell). In a cascade process in which different catalysts are used in sequential reactors, the catalyst from the preceding reactor remains active following discharge of the reaction mixture into the next reactor. Inevitably, this results in a lack of control over the characteristics of the final polymer product. For example, in the case where a Ziegler-Natta catalyst used in a first polymerization stage remains active during a second stage effected in the presence of a different catalyst system, a large proportion of the final polymer material will comprise a high molecular weight polymer having a broad molecular weight distribution. This can lead to undesirable polymer properties.

WO 96/11218 (Montell) describes a multi-stage polymerization process in which a first catalyst is deactivated prior to the introduction of a second catalyst system. Specifically, the process described in WO 96/11218 comprises a first stage in which a propylene polymer is produced in the presence of a first titanium or vanadium catalyst, a second stage in which the catalyst is deactivated, and a third stage in which polymerization is continued in the presence of a second metallocene catalyst. Such a cascade process is believed to result in good homogenization of the resulting polymer blend. However, the need to deactivate the first catalyst before the polymer particles can be impregnated with the second catalyst makes this process unnecessarily complex and not cost effective. A further disadvantage of this process is that the second catalyst is relatively quickly flushed out of the reactor as a result of the high throughput of polymer material into the third stage of the polymerization process.

Contrary to current thinking, we have now found that the demands of the step of homogenization of a polypropylene based polymer and an elastomeric polymer, e.g. a plastomer, are not essential to provide a polypropylene material having the desired properties of high impact resistance, resistance to stress whitening, etc. As a result, preparation of the individual polymer materials can be effected in separate polymerization reactors run in parallel followed by simple blending (e.g. compounding) of the resulting polymer components. This offers significant advantages in terms of costs, process operability, optimization of desired polymer properties, etc. Surprisingly, we have found that adequate homogenization can readily be achieved by co-extrusion of the separately produced polymer materials.

SUMMARY OF THE INVENTION

Thus, viewed from one aspect, the invention provides a process for the production of a propylene based polymer, which process comprises:
(a) a first polymerization stage comprising homopolymerizing propylene or copolymerizing propylene and at least one α-olefin in the presence of an α-olefin polymerization catalyst whereby to produce a polypropylene component;

(b) a second polymerization stage comprising copolymerizing ethylene and at least one α-olefin in the presence of an α-olefin polymerization catalyst whereby to produce an ethylene/α-olefin copolymer component; and (c) blending the polymer components produced in steps (a) and (b) whereby to produce a polymer blend, wherein said first and second polymerization stages are effected in separate polymerization reactors connected in parallel.

Preferably, blending may be effected by co-extrusion of the polymer components produced in steps (a) and (b). Alternatively, the process of the invention may comprise the further step of extruding the polymer mixture following simple blending of the polymer components whereby to produce a substantially homogenous polymer.

In addition to the advantages outlined above, the process herein described effectively permits an increase in the duration of the second polymerization stage (since the total output from that stage is the elastomeric, e.g. plastomeric, component). The ability to increase the residence time in the reactor (e.g. a gas phase reactor) increases the productivity of any catalyst used. This also permits increased flexibility of the process in terms of altering the desired mechanical properties of the final polymer blend.

Polymers produced by a process according to the invention exhibit good impact properties, enhanced stress whitening resistance, and good optical properties (haze). Such polymers form a further aspect of the invention.

DETAILED DESCRIPTION OF THE PREFERRED EMBODIMENT

As used herein, the term "polymerization" is not intended to be limited to homopolymerization, but also includes copolymerization (which term includes polymerization of two or more comonomers). Similarly, the term "polymer" is not limited to homopolymer but also encompasses copolymer (which term includes polymers derived from two or more comonomers). Since monomer feedstock may comprise small quantities of copolymerizable impurities, the term "homopolymer" as used herein is intended to denote a polymer deriving at least 99% by weight from a single monomer.

The propylene component that may be prepared in step (a) may be a propylene homopolymer, copolymer or mixture thereof (e.g. a mixture of copolymers). Where a copolymer component is produced this may be a random or heterophasic copolymer. Preferably where a copolymer is produced this will be a random copolymer. Comonomers which may be used to produce the copolymers include monomers copolymerizable with propylene, for example comonomers selected from ethylene and $C_{4-20}$ mono or multiply unsaturated monomers, in particular ethylene and $C_{4-10}$ α-olefins, e.g. but-1-ene, pent-1-ene, 3-methyl-but-1-ene, 4-methyl-pent-1-ene, hex-1-ene, 3,4-dimethyl-but-1-ene, hept-1-ene, 3-methyl-hex-1-ene. Preferably the monomers will be selected from ethene, but-1-ene, hex-1-ene and oct-1-ene. The propylene copolymers will typically have a propylene content of at least 90 mole %, e.g. at least 95 mole %.

Where a heterophasic copolymer is produced in the first polymerization stage, step (a) will typically comprise the following steps:

(i) homopolymerizing propylene or copolymerizing propylene and at least one α-olefin in a first reactor whereby to produce a polypropylene polymer or copolymer; and (ii) further polymerizing propylene and at least one α-olefin (e.g. ethylene) in a further reactor (e.g. a gas phase reactor) in the presence of said propylene polymer or copolymer whereby to produce a heterophasic copolymer (i.e. said polypropylene component).

Propylene polymers and copolymers produced in the first polymerization stage will typically have a molecular weight distribution, $M_w/M_n$, in the range 2.5 to 10, preferably 3 to 8 and a Melt Flow Rate (MFR) at 230° C. of 0.1 to 300 dg/min, preferably 0.2 to 150 dg/min, e.g. 1 to 50 dg/min. Suitable MFRs may be achieved by control of the degree of polymerization of the propylene monomer using techniques well known in the art. The density of the propylene polymers or copolymers (in the absence of fillers) will generally range from 890 to 915 g/cm$^3$, preferably from 900 to 915 g/cm$^3$, e.g. 895 to 910 g/cm$^3$.

Where a propylene homopolymer or random copolymer component is produced this may have an isotactic index of at least 90% measured by NMR. Crystalline or semi-crystalline homopolymers or copolymers of propylene may be produced in the first polymerization stage. Preferred propylene polymers include those having a crystallinity greater than 30%, preferably greater than 50%

The ethylene copolymer prepared in step (b) will preferably be an ethylene/α-olefin elastomeric polymer, e.g. a plastomer. As used herein, the term "plastomer" is intended to define a class of low density ethylene based copolymers, e.g. having a density of about 870 to 920 g/cm$^3$, preferably 880 to 910 g/cm$^3$, at a weight average molecular weight (Mw) of 50,000 to 500,000, preferably 70,000 to 300,000.

Typically, the ethylene copolymer will comprise ethylene and a $C_{3-20}$ mono or multiply unsaturated monomer, in particular a $C_{3-10}$ α-olefin, e.g. propene or but-1-ene. Copolymers of ethylene and propylene, especially preferably ethylene propylene elastomeric polymers, are preferred. Typically, in cases where the comonomer is propylene, the ethylene copolymer will have an ethylene content of at least 75%, e.g. at least 85%, by weight.

Ethylene copolymers produced in the second polymerization stage will typically have a molecular weight distribution, $M_w/M_n$, in the range 1.5 to 5, preferably 2 to 3 and a Melt Flow Rate (MFR) at 190° C. of 0.01 to 100 dg/min, preferably 0.1 to 50 dg/min, e.g. 0.5 to 30 dg/min.

The preparation of polymers having the desired properties for use in the invention may be achieved using techniques well known in the art, e.g. by appropriate selection of catalyst systems, comonomers, polymerization reactor type and polymerization process conditions.

Preferably the polypropylene polymer is produced using a conventional Ziegler-Natta catalyst, e.g. a group 4 metal halide, especially a group 4 metal chloride such as TiCl$_4$ or TiCl$_3$ supported on a suitable carrier. This is advantageously used in the form of spherical particles having a mean diameter in the range of from 1 to 200 µm. Suitable methods for the preparation of such materials are described in the patent and scientific literature.

Ziegler-Natta catalysts suitable for use in the invention may also comprise an electron-donor compound. Examples of electron-donor compounds include ethers, esters, amines, aldehydes, ketones, alcohols, phenols, carboxylic acids, alkoxy silanes, alkyl alkoxy silanes, etc.

Conveniently the Ziegler-Natta catalyst will be supported using catalyst supports well known in the art, e.g. MgO, $SiO_2$, magnesium halides such as $MgCl_2$, organic polymers such as styrene/divinylbenzene copolymer. Of these, $MgCl_2$ is preferred.

Preferably the polyethylene is produced using a single site catalyst, preferably a single site catalyst capable of substantially homogenous incorporation of comonomer over the MWD of the polymer, in particular a metallocene catalyst. As used herein, the term "metallocene" is used to refer to all catalytically active metal:η-ligand complexes in which a metal is complexed by one, two or more η-ligands. The use of twin η-ligand metallocenes and single η-ligand "half metallocenes" is particularly preferred. The metal in such complexes is preferably a group 4, 5, 6, 7 or 8 metal or a lanthanide or actinide, especially a group 4, 5 or 6 metal, particularly Zr, Hf or Ti. The η-ligand preferably comprises a cyclopentadienyl ring, optionally with a ring carbon replaced by a heteroatom (e.g. N, B, S or P), optionally substituted by pendant or fused ring substituents and optionally linked by bridge (e.g. a 1 to 4 atom bridge such as $(CH_2)_2$, $C(CH_3)_2$ or $Si(CH_3)_2$) to a further optionally substituted homo or heterocyclic cyclopentadienyl ring. The ring substituents may for example be halo atoms or alkyl groups optionally with carbons replaced by heteroatoms such as O, N and Si, especially Si and O and optionally substituted by mono or polycyclic groups such as phenyl or naphthyl groups. Examples of such homo or heterocyclic cyclopentadienyl ligands are well known in the art (see e.g. EP-A-416815, WO96/04290, EP-A-485821, EP-A-485823, U.S. Pat. Nos. 5,276,208 and 5,145,819).

Thus the η-bonding ligand may for example be of formula I $$CpY_m \tag{I}$$

where Cp is an unsubstituted, mono-substituted or polysubstituted homo or heterocyclic cyclopentadienyl, indenyl, tetrahydroindenyl, fluorenyl, benzindenyl, cyclopenta[1]phenanthrenyl, azulenyl, or octahydrofluorenyl ligand; m is zero or an integer having a value of 1, 2, 3, 4 or 5; and where present each Y which may be the same or different is a substituent attached to the cyclopentadienyl ring moiety of Cp and selected from halogen atoms, and alkyl, alkenyl, aryl, aralkyl, alkoxy, alkylthio, alkylamino, $(alkyl)_2P$, alkylsilyloxy, alkylgermyloxy, acyl and acyloxy groups or one Y comprises an atom or group providing an atom chain comprising 1 to 4 atoms selected from C, O, S, N, Si and P, especially C and Si (e.g. an ethylene group) to a second unsubstituted, mono-substituted or polysubstituted homo or heterocyclic cyclopentadienyl, indenyl, tetrahydroindenyl, fluorenyl or octahydrofluorenyl ligand group.

In the η-bonding ligands of formula I, the rings fused to the homo or hetero cyclopentadienyl rings may themselves be optionally substituted e.g. by halogen atoms or groups containing 1 to 10 carbon atoms.

Many examples of such η-bonding ligands and their synthesis are known from the literature, see for example: M öhring et al. J. Organomet. Chem 479:1–29 (1994), Brintzinger et al. Angew. Chem. Int. Ed. Engl. 34:1143–1170 (1995).

Examples of suitable i-bonding ligands include the following:
cyclopentadienyl, indenyl, fluorenyl, pentamethyl-cyclopentadienyl, methyl-cyclopentadienyl, 1,3-di-methyl-cyclopentadienyl, i-propyl-cyclopentadienyl, 1,3-di-i-propyl-cyclopentadienyl, n-butyl-cyclopentadienyl, 1,3-di-n-butyl-cyclopentadienyl, t-butyl-cyclopentadienyl, 1,3-di-t-butyl-cyclopentadienyl, trimethylsilyl-cyclopentadienyl, 1,3-di-trimethylsilyl-cyclopentadienyl, benzyl-cyclopentadienyl, 1,3-di-benzyl-cyclopentadienyl, phenyl-cyclopentadienyl, 1,3-di-phenyl-cyclopentadienyl, naphthyl-cyclopentadienyl, 1,3-di-naphthyl-cyclopentadienyl, 1-methyl-indenyl, 1,3,4-tri-methyl-cyclopentadienyl, 1-i-propyl-indenyl, 1,3,4-tri-i-propyl-cyclopentadienyl, 1-n-butyl-indenyl, 1,3,4-tri-n-butyl-cyclopentadienyl, 1-t-butyl-indenyl, 1,3,4-tri-t-butyl-cyclopentadienyl, 1-trimethylsilyl-indenyl, 1,3,4-tri-trimethylsilyl-cyclopentadienyl, 1-benzyl-indenyl, 1,3,4-tri-benzyl-cyclopentadienyl, 1-phenyl-indenyl, 1,3,4-tri-phenyl-cyclopentadienyl, 1-naphthyl-indeny, 1,3,4-tri-naphthyl-cyclopentadienyl, 1,4-di-methyl-indenyl, 1,4-di-i-propyl-indenyl, 1,4-di-n-butyl-indenyl, 1,4-di-t-butyl-indenyl, 1,4-di-trimethylsilyl-indenyl, 1,4-di-benzyl-indenyl, 1,4-di-phenyl-indenyl, 1,4-di-naphthyl-indenyl, methyl-fluorenyl, i-propyl-fluorenyl, n-butyl-fluorenyl, t-butyl-fluorenyl, trimethylsilyl-fluorenyl, benzyl-fluorenyl, phenyl-fluorenyl, naphthyl-fluorenyl, 5,8-di-methyl-fluorenyl, 5,8-di-i-propyl-fluorenyl, 5,8-di-n-butyl-fluorenyl, 5,8-di-t-butyl-fluorenyl, 5,8-di-trimethylsilyl-fluorenyl, 5,8-di-benzyl-fluorenyl, 5,8-di-phenyl-fluorenyl and 5,8-di-naphthyl-fluorenyl.

Besides the η-ligand, the metallocene catalyst for use in the invention may include other ligands; typically these may be halide, hydride, alkyl, aryl, alkoxy, aryloxy, amide, carbamide or other two electron donor groups.

Particularly preferably the metallocene is an unbridged bis-substituted cyclopentadienyl zirconium compound in which the substituents, which may be the same or different, are selected from chloride, amide and methyl.

The catalyst systems herein described may be used in combination with co-catalysts or catalyst activators and in this regard any appropriate co-catalyst or catalyst activator may be used. For metallocene catalysts, aluminium alkyl compounds, e.g. aluminoxanes, and boron-containing co-catalysts are preferred. Suitable aluminoxanes include $C_{1-10}$ alkyl aluminoxanes, e.g. methyl aluminoxane (MAO) and isobutyl aluminoxane, especially MAO.

Aluminoxane co-catalysts are described by Hoechst in WO-A-94/28034. These are considered multicyclic oligomers having up to 40, preferably 3 to 20, —[Al(R")O]— repeat units (where R" is hydrogen, $C_{1-10}$ alkyl, preferably methyl, or $C_{6-18}$ aryl or mixtures thereof).

The Ziegler-Natta catalyst is preferably activated by trialkyl aluminium compounds, e.g. triethyl aluminium.

It is particularly desirable that the metallocene complex be supported on a solid substrate. Such substrates are preferably porous particulates, e.g. inorganic oxides such as silica, alumina, silica-alumina or zirconia, inorganic halides such as magnesium chloride, or porous polymer particles, e.g. acrylate polymer particles or styrene-divinylbenzene polymer particles which optionally carry functional groups such as hydroxy, carboxyl etc. Particle sizes are preferably in the range 10 to 60 μm and porosities are preferably in the range 1 to 3 mL/g. The complex may be loaded onto the support before, or more preferably after it has been reacted with a co-catalyst. Desirably, inorganic supports are heat treated (calcined) before being loaded with the complex.

The process of the invention is carried out in at least two polymerization stages, preferably using at least two polymerization reactors connected in parallel and which are operated separately. Each polymerization stage may consist of one or more polymerization reactors and may be effected using conventional procedures, e.g. as a slurry, gas phase, solution or high pressure polymerization. Slurry polymerization (e.g. bulk polymerization) is preferably effected, e.g. in a tank reactor or more preferably a loop reactor.

Each polymerization stage may itself comprise the use of a series of two or more reactors in which polymerization may be effected under different conditions. Preferably, each stage will comprise the use of loop and/or gas phase reactors, e.g. a combination of loop and loop, gas phase and gas phase, or most preferably a combination of loop and gas phase reactors. Such multi-stage polymerization processes carried out in two or more reactors provide for the possibility of independently varying, in any given reactor, process parameters such as temperature, pressure, type and concentration of monomer, concentration of hydrogen, etc. This allows a greater degree of control over the composition and properties of the resulting polymer material compared with a single-stage process. Any multi-stage process will typically be carried out using the same catalyst in each reactor—the product obtained in one reactor is discharged and passed directly into the next reactor without altering the nature of the catalyst.

Typical reaction conditions for loop and gas phase reactors are: loop—temperature 60–110° C., pressure 30–100 bar, mean residence time 30–120 minutes; and gas phase—temperature 60–110° C., pressure 10–50 bar, mean residence time 20–300 minutes. Where hydrogen is used to control molecular weight/$MFR_2$, the hydrogen partial pressure will typically be 0.001 to 10 bar.

Preferably, the first polymerization stage used to prepare the polypropylene matrix will be a multi-stage process in which propylene is homopolymerized or copolymerized in a series of loop and gas phase reactors. Most preferably, the same catalyst will be used in each reactor. In the first stage, polymerization of propylene is preferably carried out at a temperature of 40 to 130° C., preferably 60 to 100° C. and at a pressure of 5 to 100 bar, e.g. 10 to 70 bar.

The second polymerization stage in which the elastomeric component, e.g. a plastomer, is prepared may similarly comprise a multi-stage process. However, typically this will be effected in a single gas phase reactor. In the second stage, copolymerization of ethylene is preferably carried out at a temperature of 0 to 140° C., preferably 50 to 100° C. and at a pressure of 3 to 100 bar, e.g. 5 to 70 bar.

In any of the reactors herein described, the (major) monomer may also function as a solvent/carrier as well as a reagent, or alternatively a non-polymerizable organic compound, e.g. a $C_{3-10}$ alkane, for example propane or isobutane, may be used as a solvent/carrier. Where this is done, the volatile non-reacted or non-reactive materials will desirably be recovered and re-used, especially where gas phase reactors are used.

Figure 1:
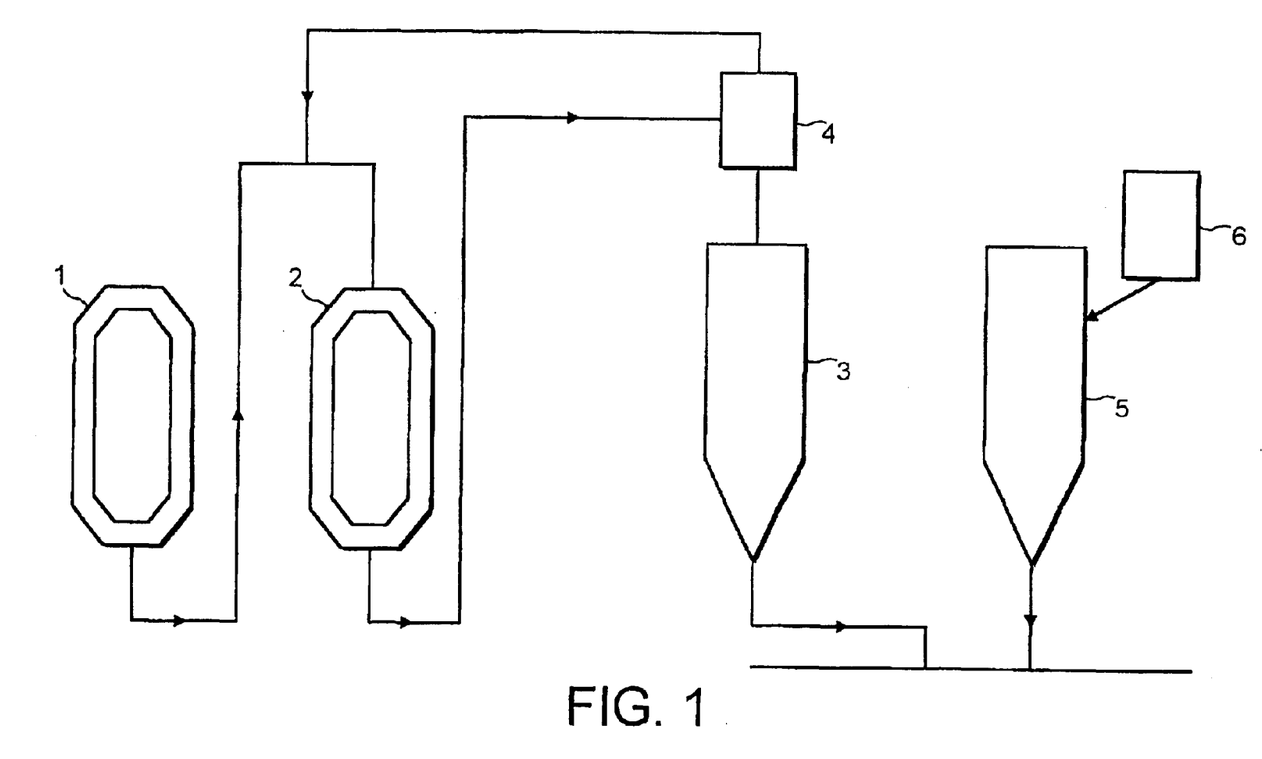
FIG. 1 is a schematic representation of the process flow diagram according to the present invention.

A flow diagram illustrating a preferred embodiment of a process in accordance with the invention is shown in attached FIG. 1. The first stage of polymerization in which propylene is polymerized, optionally in the presence of one or more α-olefins, comprises sequential polymerization in two loop reactors (1, 2) followed by polymerization in a gas phase reactor (3). The catalyst and monomers are fed into the first loop reactor (1). Solid polymer material is separated from non-reacted material in separator (4) and re-cycled. Preparation of the polyethylene plastomer is effected in a single gas phase reactor (5) provided with a separate catalyst feed (6). The resulting polymer components are then subjected to blending.

The polymer components produced in step (a) and step (b) will typically be in the form of a powder, e.g. having a mean particle size from a few $\mu$m up to several mm, preferably from 10 $\mu$m to 10 mm, e.g. from 100 $\mu$m to 6 mm. These components can be compounded or blended together, for example using conventional extruders in which the individual components are blended as a melt under high shear stresses or using conventional mixing equipment. Alternatively, the components may be blended prior to the step of melt blending or these can be introduced separately into the melt blending stage.

Single screw extruders, co-rotating or counter-rotating twin-screw extruders, cone extruders, etc. are suitable for use in the invention, for example those available from Werner & Pfleider (W & P), Germany or Japan Steel Work (JSW), Japan. Typically, these will have a barrel length:diameter of about 18 and comprise co-rotating twin-screws each having a screw diameter of about 100 to 400 mm. In general, extrusion may be effected at a temperature of from 200 to 300° C., at a screw speed of 200 to 600 rpm, e.g. about 400 rpm, and at a specific energy input in the range of from 100 to 300 kWh per 1000 kg polymer.

In general, the amount of ethylene copolymer incorporated into the final polymer blend will be from 2 to 40% by weight of the composition, e.g. 5 to 20% by weight.

The process of the invention can be used to prepare a wide range of polymer materials, in particular heterophasic copolymers of propylene. Particularly preferred polymer materials are those formed from a polypropylene based polymer and a plastomer containing more than about 60% by weight ethylene. Such materials are considered to be novel and form a further aspect of the invention.

Viewed from a further aspect the invention thus provides a polymer composition comprising:
  (i) 30 to 97% by weight, preferably at least 80%, e.g. 80 to 95% by weight, based on the total weight of the polymer composition, of a propylene based polymer, e.g. a propylene homopolymer, a random copolymer of propylene or a polypropylene heterophasic copolymer; and
  (ii) 3 to 70% by weight, based on the total weight of the polymer composition, of an ethylene copolymer plastomer containing at least 60% by weight ethylene.

Particularly preferred compositions in accordance with the invention include those comprising:
  (i) 30 to 97% by weight of a propylene based polymer containing greater than 95 mol. % propylene units; and
  (ii) 3 to 70% by weight of a plastomer containing greater than 75 mol. % ethylene units.

Plastomers comprising ethylene and a $C_{3-10}$ α-olefin, e.g. propene, but-1-ene or octene, are preferred. Most preferably, the plastomer component will comprise an ethylene:propylene plastomer.

Typically, the plastomer component will be present in an amount of up to 30% by weight, preferably from 2 to 25%, more preferably from 5 to 20%, e.g. 10 to 15% by weight. Because the presence of the plastomer in the propylene polymer compositions affects the impact strength, the stress whitening resistance and the stiffness of the product, the specific amount included will depend on the desired balance between these properties.

Component (ii) may, for example, comprise an ethylene copolymer plastomer having a substantially uniform or homogenous incorporation of comonomer (e.g. propene)

over the MWD of the polymer. Most preferably, the plastomer component will consist essentially of propylene and ethylene units, i.e. this will be substantially free from unreacted comonomer material.

Most preferably, the major component of the plastomer present in the compositions described herein will be ethylene. Typically, this will be an ethylene-propylene plastomer comprising at least 60% by weight, preferably at least 70% by weight, e.g. at least 80% by weight ethylene. The density of the plastomer component will generally be less than 930 kg/m$^3$ and will typically lie in the range of from 880 to 920 kg/m$^3$, preferably 890 to 910 kg/m$^3$, e.g. about 902 kg/m$^3$. High melt flow rate ethylene copolymer plastomers are preferred, e.g. those having an MFR$_2$@190° C. in the range of from 0.1 to 60 g/10 min, e.g. 0.5 to 30 g/10 min. Such plastomers with butene, hexene or octene as comonomer are commercially available (e.g. as Exact 0201, Exact 2M011, Exact 4041, Exact 3017, Exact 2M048, Exact 0203, Exact 2M009 and Exact 2M005 from Dex plastomers of the Netherlands). Propylene based plastomers may be made using polymerization processes known in the art.

In the compositions of the invention the propylene based polymer may be selected from the group consisting of propylene homopolymers, propylene heterophasic copolymers and propylene random copolymers. Preferred for use in the invention are propylene based materials having a MFR$_2$@230° C. of from 0.1 to 200 g/10 min, e.g. from 0.3 to 150 g/10 min.

To ensure satisfactory blending of the propylene based polymer and plastomer, it may be necessary to select materials having similar or substantially identical viscosities. For example, the ratio of the MFR$_2$ values for the propylene and plastomer components may be selected to be within the range of from 0.1 to 10, e.g. from 0.3 to 5.

Propylene based polymers and plastomer components suitable for use in preparing the compositions of the invention are known in the art or may be produced using techniques well known in the art, e.g. by appropriate selection of catalyst systems, comonomers, polymerization reactor type and polymerization process conditions. Typically, the propylene based polymer will be produced using a Ziegler-Natta catalyst, preferably a supported Ziegler-Natta catalyst system (especially a high yield Ziegler Natta catalyst containing Ti, Cl, Mg and Al). The plastomer component is preferably produced using a metallocene or other single site catalyst material, optionally in combination with a co-catalyst. Metallocene:aluminoxane catalyst systems are preferred. The separate polymer components may be prepared in separate polymerization stages carried out in separate polymerization reactors connected in parallel as herein described.

The polymer materials described herein have several beneficial properties, including high transparency and impact strength especially at low temperatures, resistance to stress whitening, low levels of extractables, etc. In particular, these have a good balance between impact resistance, stiffness and stress whitening resistance. For example, these may have the following properties:

MFR$_2$: 0.1 to 200 dg/min, preferably 0.3 to 150 dg/min;
Tensile modulus: from 200 to 2,500 MPa, preferably 400 to 2000 MPa;
Impact Falling Weight (Total penetration energy) at 0° C. (measured according to ISO 6603-2): at least 1 J, preferably at least 5 J, e.g. 4 to 60 J;
Impact Falling Weight (Total penetration energy) at −20° C. (measured according to ISO 6603-2): at least 0.5 J, preferably at least 4 J;
Charpy impact at 0° C. (measured according to ISO 179/1 eA): 2 to 15 KJ/m$^2$;
Charpy impact at −20° C. (measured according to ISO 179/1 eA): 1 to 15 KJ/m$^2$;
Stress Whitening Resistance (measured according to BTM 16114, Borealis A/S, Denmark—see Bakshi et al., Polymer Testing 8:191–199, 1989, and Example 5 herein): 0 to 10, preferably 0.1 to 5;
Haze (measured according to ASTM 1003 on 2 mm injection moulded plates): less than 70%, preferably less than 40%.

The polymers produced in accordance with the invention may be formulated together with conventional additives, e.g. antioxidants, UV-stabilizers, colors, fillers, etc. prior to use. Alternatively, such additives may be added to the polypropylene/plastomer mixture prior to blending.

The resulting polymer materials can be readily extruded, molded or otherwise formed to produce a wide range of articles, such as containers, boxes, crates, toys, household articles, automotive parts, cups, films, profiles, pipes, cable insulation, etc. Generally, the polymer pellets formed following extrusion are supplied to an injection molding machine for injection molding into shaped products. Films may also be produced using conventional cast film techniques and subsequently processed by thermoforming. Alternatively, the polymer pellets may be blow moulded using conventional moulding equipment, or subjected to further grinding to form micropellets or powder which may be used in rotomolding techniques.

Viewed from a yet further aspect the invention provides the use of a polymer composition according to the invention in the manufacture of articles having high impact resistance, for example by a molding or extrusion technique.

Due to their low level of extractables, the polymers herein described may also find use in packaging of food and medical products where it is essential that this should not contaminate the packaged product.

Figure 2:
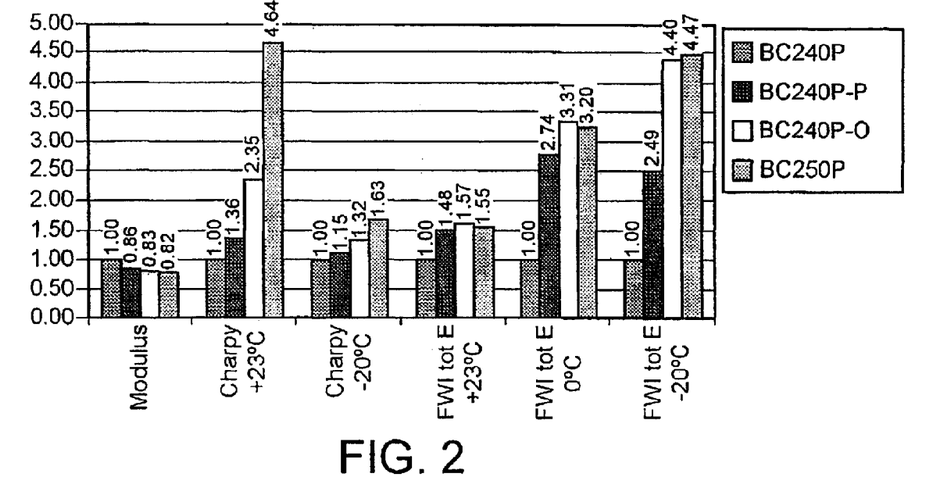
FIGS. 2–5 are various graphs which depict the mechanical properties of the polymer blends relative to that of the basic polypropylene material.
Figure 3:
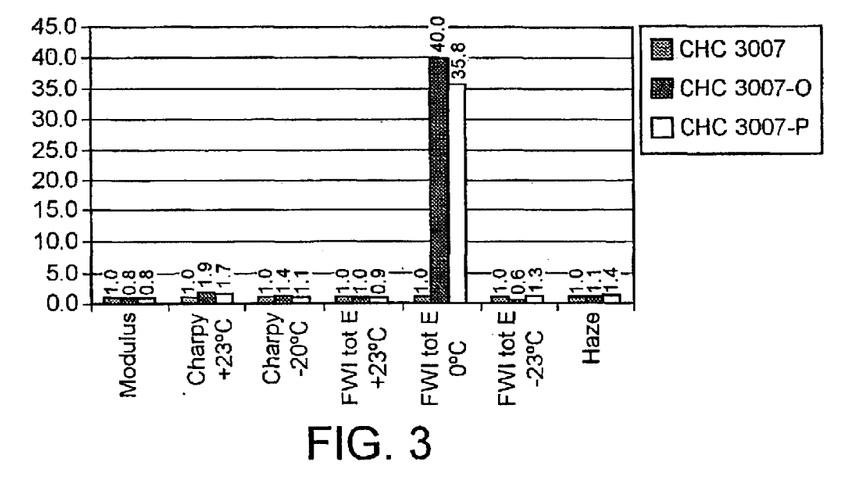
Figure 4:
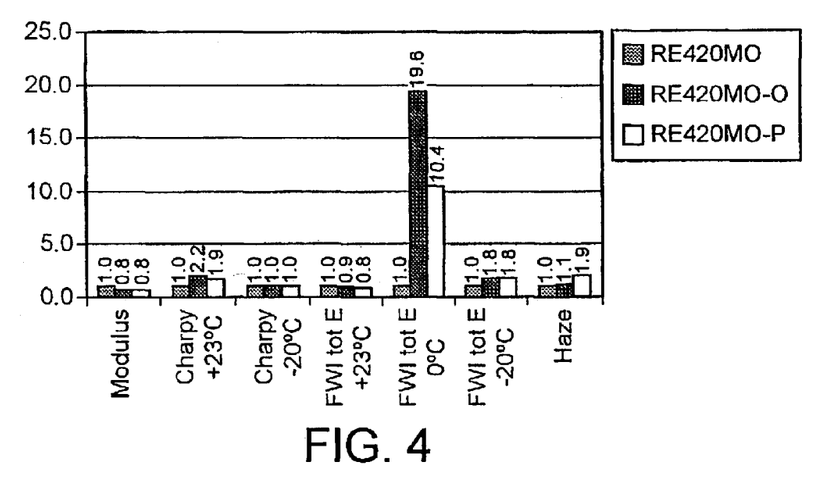
Figure 5:
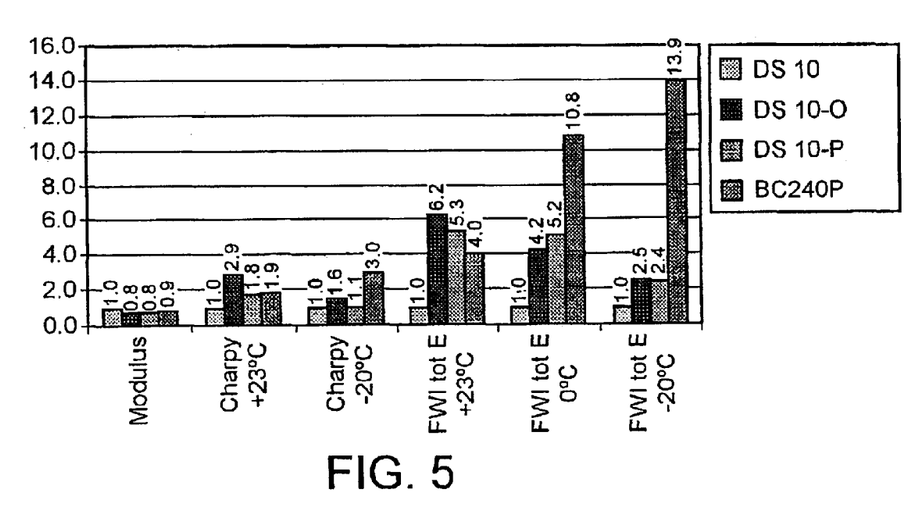

The invention will now be further described with reference to the following non-limiting Examples and the accompanying Figures in which:

FIG. 1 is a schematic representation of a parallel reactor process in accordance with the invention;

FIG. 2 is a chart showing various mechanical properties of a heterophasic polypropylene copolymer (MFR$_2$@230° C.=3.5 g/10 min) blended with C3 and C8 plastomers (values given relative to the heterophasic copolymer). BC250P (commercially available from Borealis A/S, Denmark) is a reference polymer material having a higher content of ethylene-propylene rubber than the heterophasic polypropylene copolymer;

FIG. 3 is a chart showing various mechanical properties of a random polypropylene copolymer (MFR$_2$@230° C.=1.5 g/10 min) blended with C3 and C8 plastomers (values given relative to the random copolymer);

FIG. 4 is a chart showing various mechanical properties of a random polypropylene copolymer (MFR$_2$@230° C.=12 g/10 min) blended with C3 and C8 plastomers (values given relative to the random copolymer);

FIG. 5 is a chart showing various mechanical properties of a polypropylene homopolymer (MFR$_2$@230° C.=2.0 g/10 min) blended with C3 and C8 plastomers (values given relative to the polypropylene homopolymer).

Figure 6:
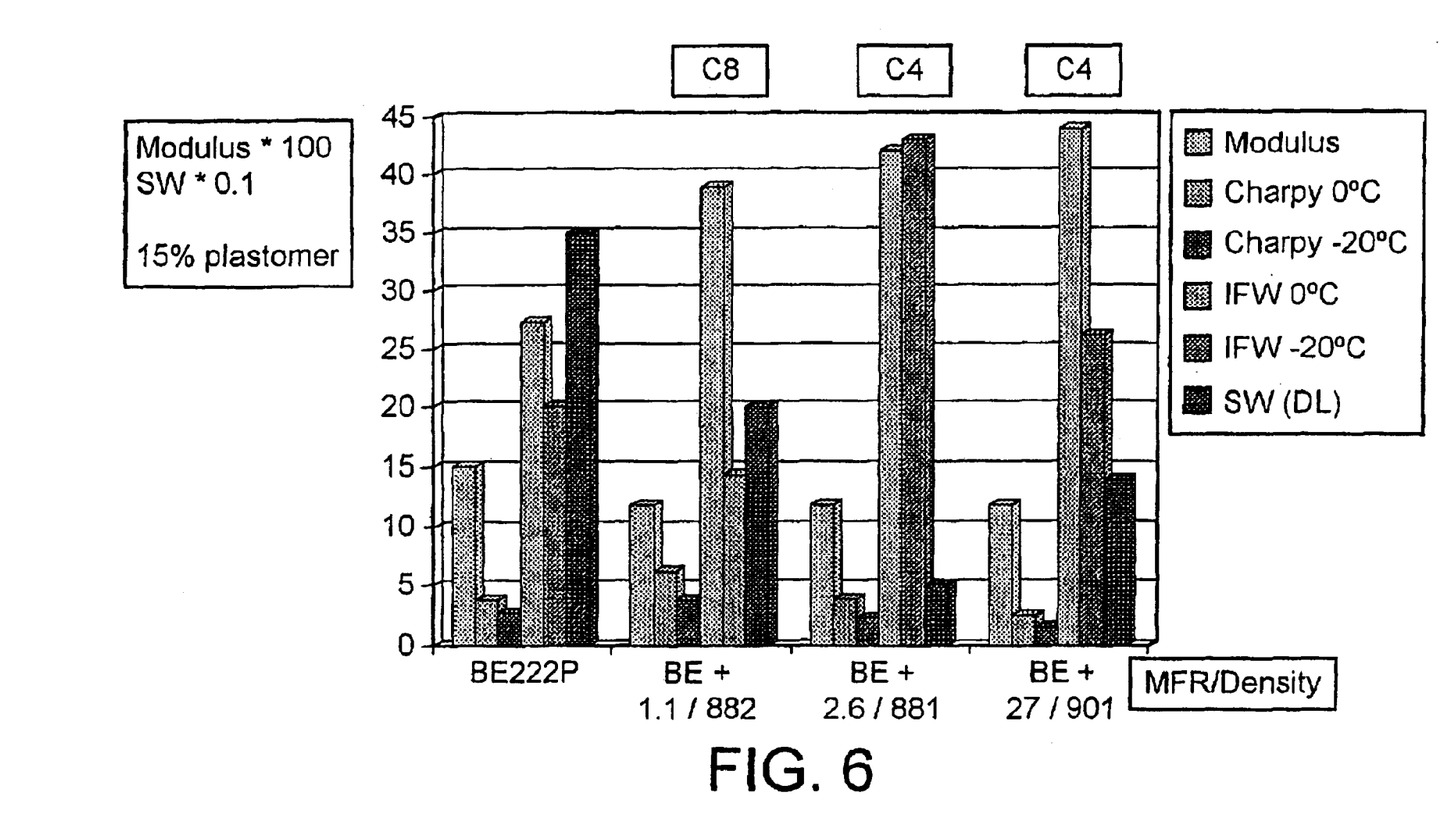
FIG. 6 is a graph demonstrating that stress whitening resistance is increased when plastomer is added to the basic polypropylene material.
Figure 7:
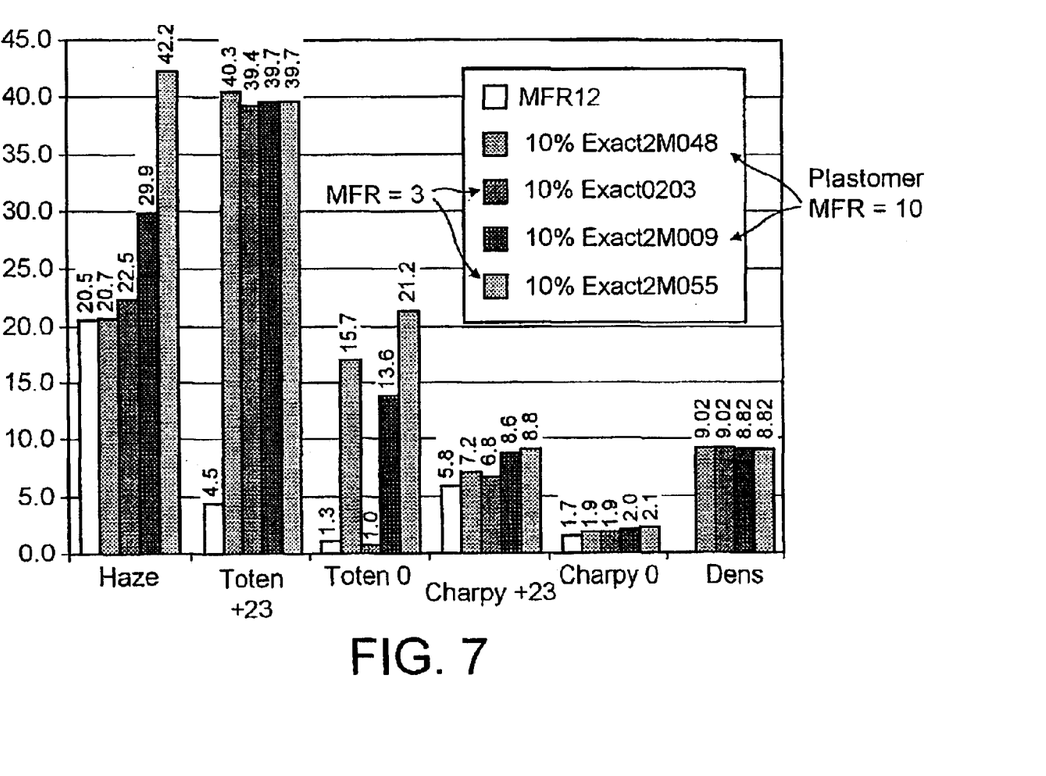
FIG. 7 is a graph depicting the analysis results for the products from Example 6.

FIG. 6 is a chart showing various mechanical properties of a heterophasic polypropylene copolymer ($MFR_2$@230° C.=13 g/10 min) blended with C4 and C8 plastomers (Modulus values are multiplied by 100; stress whitening resistance (SW) values are multiplied by 0.1); and FIG. 7 is a chart showing haze, falling impact weight (Tot. en) and Charpy impact properties for a random polypropylene copolymer blended with various C8 plastomers.

EXAMPLE 1

Preparation of Polymer Materials

A propylene based polymer powder is produced using a conventional Ziegler-Natta catalyst in a first reactor or series (cascade) of reactors. The product may be a homopolymer, a random co-polymer or heterophasic co-polymer.

In a second gas phase reactor a single site catalyst is used to produce an ethylene based polymer powder. Density and MFR of the resulting polymer may be controlled by comonomer and hydrogen concentrations. The reaction temperature is controlled to achieve optimum catalytic activity and to avoid fouling of the reactor. The reactor temperature may be as low as 70° C.

When the desired density and MFR are achieved for the polyethylene polymer, this is combined with the polypropylene polymer produced in the first reactor, preferably in a deactivating unit (e.g. a steamer such as conventionally used in the Spheripol process). The combined product may be treated at this stage, e.g. by adding conventional additives such as anti-oxidants, nucleators, fillers, anti-static agents, etc., prior to compounding in a conventional extruder.

It is to be expected that for a given reactor volume of the second gas phase reactor, the residence time will be relatively long compared to a conventional cascade process (e.g. as described in WO 96/11218 to Montell). For example, in the case where the ethylene based polymer comprises 10% by weight of the total polymer produced, the residence time in the second gas phase reactor may be expected to be 10 times longer than in a conventional cascade process. As a result, the catalyst productivity (i.e. kg polymer produced per g catalyst) can be expected to be significantly higher when using the process in accordance with the invention.

EXAMPLE 2

Compounding Process

Polypropylene random copolymers produced using Ziegler-Natta catalysts are co-extruded with single site polyethylene copolymers produced using octene and butene. Extrusion may be effected using a conventional twin-screw extruder (e.g. available from Werner & Pfleider (W & P), Germany operated at a temperature of from 200 to 300° C., a screw speed of about 400 rpm, and at a specific energy input in the range of from 100 to 300 kWh per 1000 kg polymer.

EXAMPLE 3

Preparation of a C3 Plastomer

A total of 950 g C3 plastomer (Samples 1–10) was produced using a Gas Phase reactor (bench scale). Each polymerization reaction was effected using the catalyst bis-indenyl-zirconium-di-chloride (supported on silica) with MAO as a co-catalyst under the following reaction conditions:

Starting temperature: 60° C.
Polymerization temperature: 70° C.
Amount of propylene: 15 g (31.7 mol %)
Amount of ethylene: 68.3 mol %
Polymerization pressure: 1.64 MPa
Amount of catalyst: 105–115 mg In each case, 0.2% anti-oxidant (Irganox 1010 from Ciba) was added to the final polymer powder. The anti-oxidant was added as a solution in methanol and the solvent was subsequently evaporated at ambient temperature.

The properties of Samples 1–10 are shown in Table I below:

TABLE I

| Sample | [1]$MFR_2$ (g/10 min) | [2]$MFR_{21}$ (g/10 min) | $MFR_{21}$/ $MFR_2$ | Density (kg/m$^3$) | Yield (g) |
|---|---|---|---|---|---|
| 1 | 0.53 | 8.6 | 16.2 | 907.0 | 91 |
| 2 | 0.49 | 8.3 | 16.9 | 905.9 | 90 |
| 3 | 0.47 | 7.7 | 16.4 | 907.3 | 91 |
| 4 | 0.57 | 9.4 | 16.7 | 907.0 | 92 |
| 5 | 0.52 | 8.6 | 16.5 | 905.7 | 90 |
| 6 | 0.50 | 8.1 | 16.2 | 906.9 | 92 |
| 7 | 0.53 | 8.6 | 16.2 | 907.1 | 90 |
| 8 | 0.57 | 9.4 | 16.5 | 907.0 | 94 |
| 9 | 0.57 | 9.4 | 16.5 | 905.8 | 91 |
| 10 | 0.53 | 8.9 | 16.8 | 906.6 | 91 |

[1]$MFR_2$ determined at 190° C. using 2.16 kg load according to ISO 1133
[2]$MFR_{21}$ determined at 190° C. using 21.6 kg load according to ISO 1133

Samples 1–10 were subsequently compounded in a 16 mm Prism extruder (available from PRISM, Staffordshire, UK). $MFR_{21}$ of the final product at 230° C. was 1.0 g/10 min.

EXAMPLE 4

Preparation of Polymer Blends With C3 and C8 Plastomers

Various polymer materials were obtained as set out in Table II below. Polymer blends were prepared by compounding the basic polypropylene material with the plastomer using a 16 mm Prism extruder.

TABLE II

| Product No. | Polypropylene (PP) material | PE Plastomer | Additives |
|---|---|---|---|
| 1 | 100 wt. % BC240P[1] | — | — |
| 2 | 85 wt. % BC240P[1] | 15 wt. % C8 plastomer[5] | — |
| 3 | 85 wt .% BC240P[1] | 15 wt. % C3 plastomer[6] | — |
| 4 | 100 wt. % CHC3007[2] | — | — |
| 5 | 85 wt. % CHC3007[2] | 15 wt. % C8 plastomer[5] | — |
| 6 | 85 wt. % CHC3007[2] | 15 wt. % C3 plastomer[6] | — |
| 7 | 100 wt. % RE420MO[3] | — | — |
| 8 | 85 wt. % RE420MO[3] | 15 wt. % C8 plastomer[5] | — |
| 9 | 85 wt. % PE420MO[3] | 15 wt. % C3 plastomer[6] | — |
| 10 | 100 wt. % DS10[4] | — | 2000 ppm MdBS[7] |

TABLE II-continued

| Product No. | Polypropylene (PP) material | PE Plastomer | Additives |
|---|---|---|---|
| 11 | 85 wt. % DS10[4] | 15 wt. % C8 plastomer[5] | 2000 ppm MdBS[7] |
| 12 | 85 wt. % DS10[4] | 15 wt. % C3 plastomer[6] | 2000 ppm MdBS[7] |

[1]BC240P = heterophasic polypropylene co-polymer available from Borealis A/S, Denmark (MFR$_{21}$ @ 230° C. = 3.5 g/10 min, Tensile modulus = 1418 MPa)
[2]CHC3007 = random polypropylene copolymer available from Borealis A/S, Denmark (MFR$_{21}$ @ 230° C. = 1.5 g/10 min, Tensile modulus = 792 MPa)
[3]RE420MO = random polypropylene copolymer available from Borealis A/S, Denmark (MFR$_{21}$ @ 230° C. = 12.0 g/10 min, Tensile modulus = 884 MPa)
[4]DS10 = polypropylene homopolymer available from Borealis A/S, Denmark (MFR$_{21}$ @ 230° C. = 2.0 g/10 min, Tensile modulus = 1521 MPa)
[5]C8 plastomer (Exact 0201 available from Dex-Plastomers – comonomer = octene, MFR$_{21}$ @ 190° C. = 1.1 g/10 min, density = 902 kg/m$^3$).
[6]C3 plastomer produced in accordance with Example 3
[7]1,3-di (methylbenzylidene) sorbitol (CAS No. 54686-97-4)

Specimens were analysed to determine the following properties:

Falling Weight Impact (FWI) determined according to DIN53443
Optical Properties (Haze) measured for 2 mm injection moulded plates according to ASTM D1003
Tensile Modulus determined according to ISO 572-2
Charpy notched impact determined according to ISO 179/1 eA Mechanical properties of the polymer blends relative to that of the basic polypropylene material are shown in attached FIGS. 2 to 5.

FIG. 2 shows that by adding 15 wt. % C8 plastomer, FWI@ –20° C. can be increased to a level of 4.5 times that of the basic polypropylene material (BC240P). This is roughly equivalent to that of the reference material BC250P (available from Borealis A/S, Denmark). By adding 15 wt. % C3 plastomer, the increase in FWI@ –20° C. is to a level about 2.5 times that of BC240P. An increase in the amount of plastomer in the blend could result in even higher FWI and thus increased stiffness properties, should this be desirable. Although stress whitening resistance (SWR) was not measured for the blended materials, this can be expected to be at least equal or better than that for the base polymer, BC240P. The increase in impact resistance (Charpy) at –20° C. is 15% for the C3 plastomer blend, 30% for the C8 plastomer blend and 60% for BC250P. An increase in impact strength (Charpy) could similarly be expected with an increase in the amount of plastomer.

As shown in FIG. 3, both C3 and C8 plastomers give a dramatic improvement in FWI@ 0° C. This is of particular interest when using the polymer materials at refrigeration temperatures. Both plastomers make the deformation ductile and the increase in FWI@ 0° C. is about 40 times that for the basic polypropylene material (RACO). The effect is marginal at –20° C. At +23° C., a significant increase in impact strength (Charpy) is seen for both C3 (+70%) and for C8 (+90%) plastomer blends. Charpy was not measured at 0° C. At –20° C. the increase in Charpy for C3 is +10% and for C8 is +40%. The increase in Haze seen for the C3 plastomer compared to the C8 plastomer is believed to be caused by the higher density and possibly the broad co-monomer distribution of the C3 plastomer. For a C3 plastomer made under constant reactor conditions and having a target density of 902 kg/m$^3$, the haze could be expected to be identical to that of the C8 plastomer. The C8 plastomer gives a very acceptable Haze.

In FIG. 4, FWI at –20° C. is increased 10-fold for the C3 plastomer and 20-fold for the C8 plastomer compared to the basic polypropylene material (RACO). At –20° C. the increase is +80% for both plastomers. At +23° C. both C3 and C8 plastomers result in an approx. 2-fold increase in impact resistance (Charpy). At –20° C. Charpy is unchanged by the addition of plastomer. It can be concluded that both C3 and C8 plastomers give a positive contribution to impact resistance.

In FIG. 5, impact-stiffness balance is favourable for the blended materials at normal temperatures.

Conclusions

RACO—at refrigeration temperatures, 15 wt. % C3 plastomer can give significantly improved impact behaviour without destroying the good haze values of the base polymer. A density in the range of from 890 to 910 kg/m$^3$, preferably about 902 kg/m$^3$, is considered optimal.

HECO—although C3 plastomers are not as efficient as higher olefins, the improvement in impact resistance is nevertheless significant. It is believed that a reduction in the density of the C3 plastomer or an increase in the amount of C3 plastomer would result in an increase in Charpy and FWI@ –200° C. It can be concluded that C3 plastomers are effective as impact modifiers in heterophasic polypropylene materials.

EXAMPLE 5

Mechanical Properties of Polymer Blends With C4 and C8 Plastomers

Various polymer materials were prepared as set out in Table III below. Polymer blends were prepared by compounding the polypropylene material and plastomer in a conventional compounding extruder (Prism TSE24HC, twin screw, available from PRISM, Staffordshire, UK).

TABLE III

| Product No. | Polypropylene (PP) material | PE Plastomer |
|---|---|---|
| 1 | 100 wt. % BE222P[1] | — |
| 2 | 85 wt. % BE222P[1] | 15 wt. % C8 plastomer[2] |
| 3 | 85 wt. % BE222P[1] | 15 wt. % C4 plastomer[3] |
| 4 | 85 wt. % BE222P[1] | 15 wt. % C4 plastomer[4] |

[1]BE222P = heterophasic polypropylene copolymer available from Borealis A/S, Denmark (MFR$_2$ @ 230° C. = 13, Tensile Modulus (according to ISO 572-2) = 1500 MPa, Charpy notched impact (according to ISO 179/1eA) @ 23° C. = 6.5 kJ/m$^2$ and @ 0° C. = 4 kJ/m$^2$, IFW (according to ISO 6603-2) @ 0° C. = 27 J, @ 20° C. = 20 J)
[2]C8 plastomer (Exact 2M011 available from Dex-Plastomers – MFR$_2$ @ 190° C. = 1.1 g/10 min, density = 882 kg/m$^3$)
[3]C4 plastomer (Exact 4041 available from Dex-Plastomers – MFR$_2$ @ 190° C. = 2.6 g/10 min, density = 882 kg/m$^3$)
[4]C4 plastotner (Exact 3017 available from Dex-Plastomers – MFR$_2$ @ 190° C. = 27 g/10 min, density = 901 kg/m$^3$)

The products were analysed to determine various mechanical properties and the results are shown in attached FIG. 6.

Stress Whitening Resistance (SW) was determined according to the following method:

Definitions:

Diameter is measured on "whitened" area in two directions:

1. From point of injection through the center point
2. Perpendicular to the first line Degree of whitening is defined as delta L (DL), CIE Lab Difference (difference between unstressed and stressed material).

Method:

Circular Plates are injection moulded (diameter=60 mm, thickness=2 mm, 5.66 wt. % blue masterbatch (Voor 78000304) is added—blue articles are very sensitive to Stress Whitening). Plates are stressed by a Falling weight. Testing is done at ambient temperature. The Falling weight is equipped with an auto-catcher to prevent rebouncing at the tested sample.

Apparatus Used:

Hammel falling apparatus, type BSM 4000/1700 VD (available from Hammel Maskinfabrik A/S, Denmark).

Spectrophotometer: ICS Texion

Soft-ware: Datacolor International-dataMaster v2.0

Sample conditioning is 7 days at ambient temperature before stressing. Measurement of Stress Whitening is done one day after stressing.

---

Mass of weight = 4.0 kg
Diameter of dart = 20 mm (half sphere shaped)
Diameter of hole where the sample rests = 25 mm
Height of fall = 100 mm
Temperature = 23° C.

---

Color measurement is determined according to CIE Lab difference. Delta L (DL) is the ratio of the lightening in color of unstressed and stressed plates. A higher value for delta L represents an increase in stress whitening.

Measurement is done on the side of the plate opposite to that which is hit by the ball (diamater of aperture=25 mm). Delta L is measured at D65/10°.

From FIG. 6 it can be seen that stress whitening resistance (SWR) is increased when plastomer is added to the basic polypropylene material. C4 plastomer is more effective in improving SWR than C8 plastomer. In IFW, the influence of the MFR and density of the plastomer dominates the effect of the comonomer. The C8 plastomer is found to be most effective in increasing Charpy values.

EXAMPLE 6

Properties of Polymer Blends With C8 Plastomers

Various polymer materials were prepared as set out in Table IV below. Polymer blends were prepared by compounding the polypropylene material and plastomer in a 24 mm Prism extruder.

TABLE IV

| Product No. | Polypropylene (PP) material | PE Plastomer |
| --- | --- | --- |
| 1 | 100 wt. % RE222P[1] | — |
| 2 | 90 wt. % RE222P[1] | 10 wt. % C8 plastomer[2] |
| 3 | 90 wt. % RE222P[1] | 10 wt. % C8 plastomer[3] |
| 4 | 90 wt. % RE222P[1] | 10 wt. % C8 plastomer[4] |
| 5 | 90 wt. % RE222P[1] | 10 wt. % C8 plastomer[5] |

[1]RE222P = random polypropylene copolymer available from Borealis A/S, Denmark (MFR$_2$ @ 230° C. = 13 g/10 min)

TABLE IV-continued

| Product No. | Polypropylene (PP) material | PE Plastomer |
| --- | --- | --- |

[2]C8 plastomer (Exact 2M048 available from Dex-Plastomers – MFR$_2$ @ 190° C. = 10 g/10 min, density 902 kg/m$^3$)
[3]C8 plastomer (Exact 0203 available from Dex-Plastomers – MFR$_2$ @ 190° C. 3 g/10 min, density = 902 kg/m$^3$)
[4]C8 plastomer (Exact 2M009 available from Dex-Plastomers – MFR$_2$ @ 190° C. = 10 g/10 min, density = 882 kg/m$^3$)
[5]C8 plastomer (Exact 2M055 available from Dex-Plastomers – MFR$_2$ @ 190° C. 3 g/10 min, density = 882 kg/m$^3$)

The products were analysed to determine various properties and the results are shown in attached FIG. 7.

The density of 902 kg/m$^3$ is considered to be close to the optimal density for desired impact modification of polypropylene RACOs with retained haze values.

What is claimed is:

1. A process for the production of a propylene based polymer, which process comprises:
    (a) a first polymerization stage comprising homopolymerizing propylene or copolymerizing propylene and an α-olefin in the presence of an α-olefin polymerization catalyst whereby to produce a polypropylene component;
    (b) a second polymerization stage comprising copolymerizing ethylene and an α-olefin in the presence of an α-olefin polymerization catalyst whereby to produce an ethylene/α-olefin copolymer component; and
    (c) blending the polymer components produced in steps (a) and (b) whereby to produce a polymer blend,
    wherein said first and second polymerization stages are effected in separate polymerization reactors connected in parallel.

2. A process as claimed in claim 1 wherein the polymer components produced in step (a) and step (b) are each in the form of a powder.

3. A process as claimed in claim 1, wherein the polymer components produced in step (a) and step (b) are fed into a single deactivating unit.

4. A process as claimed in claim 1, wherein step (c) is effected by co-extrusion of said polymer components.

5. A process as claimed in claim 1, wherein said first polymerization stage is effected in the presence of a Ziegler-Natta catalyst.

6. A process as claimed in claim 1, wherein said second polymerization stage is effected in the presence of a metallocene or other single-site catalyst.

7. A process as claimed in claim 1, wherein said first polymerization stage is a multi-stage process in which propylene is homopolymerized or copolymerized in a series of loop and/or gas phase reactors.

8. A process as claimed in claim 1, wherein said second polymerization stage is effected in a single gas phase reactor or in two or more gas phase reactors.

9. A polymer material produced by a process as claimed in claim 1.

* * * * *